US008527314B2

(12) United States Patent
Nishikawa et al.

(10) Patent No.: US 8,527,314 B2
(45) Date of Patent: Sep. 3, 2013

(54) OPTIMUM SERVICE SELECTION ASSISTING SYSTEM

(75) Inventors: Hiroshi Nishikawa, Tokyo (JP); Youichi Araki, Nirasaki (JP); Kiichi Hama, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 2223 days.

(21) Appl. No.: 10/890,152

(22) Filed: Jul. 14, 2004

(65) Prior Publication Data

US 2004/0260597 A1    Dec. 23, 2004

Related U.S. Application Data

(63) Continuation of application No. PCT/JP03/01846, filed on Feb. 20, 2003.

(30) Foreign Application Priority Data

Feb. 22, 2002   (JP) .................................. 2002-046888

(51) Int. Cl.
    *G06Q 10/00*   (2012.01)
(52) U.S. Cl.
    USPC ........................................................ 705/7.13
(58) Field of Classification Search
    USPC ........................................................ 705/7.13
    See application file for complete search history.

(56) References Cited

U.S. PATENT DOCUMENTS

| 5,467,268 | A | * | 11/1995 | Sisley et al. | 705/7.16 |
| 5,712,989 | A | * | 1/1998 | Johnson et al. | 705/28 |
| 5,799,286 | A | * | 8/1998 | Morgan et al. | 705/30 |
| 5,960,408 | A | * | 9/1999 | Martin et al. | 705/11 |
| 6,272,472 | B1 | * | 8/2001 | Danneels et al. | 705/27 |
| 6,327,579 | B1 | * | 12/2001 | Crawford | 705/400 |
| 2001/0047280 | A1 | * | 11/2001 | Alexander et al. | 705/1 |
| 2002/0032594 | A1 | * | 3/2002 | Fukuda | 705/8 |
| 2002/0129116 | A1 | * | 9/2002 | Humphrey | 709/217 |

FOREIGN PATENT DOCUMENTS

| JP | 2001-306729 | 11/2001 |
| JP | 2002-7600 | 1/2002 |
| JP | 2002-56220 | 2/2002 |

OTHER PUBLICATIONS

Hickeys PointServe article, "Right Place, Right Time" published Nov. 1, 1999.*

* cited by examiner

*Primary Examiner* — Jonathan G Sterrett
(74) *Attorney, Agent, or Firm* — Rothwell, Figg, Ernst & Manbeck, P.C.

(57) ABSTRACT

A user terminal is connected through the Internet to a server. On the basis of the identification information of the client inputted from the client terminal, the server extracts an service selected by the client from a database for user management, further, extracts calculated maintenance contents for each service from a database for service management and sends them to the user terminal. Thus, the user can collect maintenance contents, such as the staff capable of providing service, the time until the user receives a service, and the charge, so that the user can utilize the information as indications to select an optimal service such as maintenance.

12 Claims, 12 Drawing Sheets

| SERVICE SELECTION NUMBER | NAME OF SERVICE ENGINEER | SKILL | TIME NEEDED | SERVICE CHARGE | NAME OF RESIDING STATION |
|---|---|---|---|---|---|
| | | | | | |
| | | | | | |
| | | | | | |
| | | | | | |

| NAME OF USER | BASE LOCATION | ID | PASSWORD | ADDRESS | NEAREST STATION | NOTE |
|---|---|---|---|---|---|---|
| T COMPANY (○○FACTORY) | TOKYO | A001 | XXXX | TOKYOTO OOKU ○○ | TOKYO | ○○ APPARATUS |
| U COMPANY (○○FACTORY) | OSAKA | B002 | XXXX | OSAKAFU OOSHI ○○ | OSAKA | ○○ EQUIPMENT |
| V COMPANY (○○FACTORY) | FUKUOKA | B003 | XXXX | FUKUOKAKEN OOSHI ○○ | FUKUOKA | ○○ APPARATUS |
| | | | | | | |

| NAME OF SERVICE ENGINEER | SKILL | SPECIALTY FEE | NAME OF RESIDING SERVICE STATION | ADDRESS | NEAREST STATION | AVAILIBILITY |
|---|---|---|---|---|---|---|
| OYAMA OO | A | ¥XXXXX | HIROSHIMA | HIROSHIMAKEN HIROSHIMA-SHI OO | HIROSHIMA | AVAILABLE |
| OMURA OYUKI | B | ¥XXXXX | HIROSHIMA | HIROSHIMAKEN HIROSHIMA-SHI OO | HIROSHIMA | NOT AVAILABLE DUE TO BUISINESS TRIP |
| OMOTO ORO | C | ¥XXXXX | KUMAMOTO | KUMAMOTOKEN KUMAMOTO-SHI OO | KUMAMOTO | AVAILABLE |
| OKAWA OHIKO | B | ¥XXXXX | OITA | OITAKEN OITA-SHI OO | OITA | AVAILABLE |
| | | | | | | |

| PARTS NUMBER P/N | PARTS NAME | QUANTITY QTy | PRICE | WAREHOUSING DATE Date | EXPECTED WAREHOUSING DATE Date |
|---|---|---|---|---|---|
| 0010-2335 | DOOR CYLINDER | 3 | ¥XXXXX | 2001.03.10 | |
| ... | ... | ... | ... | ... | |
| 0030-5023 | ELECTROMAGNETIC VALVE | 5 | ¥XXXXX | 2001.12.05 | |
| | | | | | |

FIG. 9

CONTENTS MENU

○ EXPLANATION OF SEMICONDUCTOR
  MANUFACTURING APPARATUS

○ EXPLANATION OF SERVICE PROVIDED

◎ SERVICE LIST REQUEST SUCH
  AS MAINTENACE, REPAIR, ETC.
  •
  •
  •
  •
  •
  •

PUSH A SELECTED BUTTON, PLEASE.

| BUTTON |

FIG. 10

SERVICE LIST REQUEST

USER ID

PASSWORD

REQUIRED SERVICE

SERVICE LIST PRIORITY ITEM  ○ TIME  ○ SKILL  ○ CHARGE

FILL REQUIRED ITEM AND PUSH BUTTON, PLEASE.

BUTTON

| NUMBER | NAME OF ENGINEER | SKILL | TIME NEEDED | SERVICE CHARGE | RESIDING STATION |
|---|---|---|---|---|---|
| 1 | OYAMA OO | A | 3.0 HOURS | ¥XXXXX | HIROSHIMA |
| 2 | OMOTO ORO | C | 3.2 HOURS | ¥XXXXX | KUMAMOTO |
| 3 | OKAWA OHIKO | B | 4.5 HOURS | ¥XXXXX | OITA |
| | | | | | |

FIG. 12

SERVICE LIST

| NUMBER | NAME OF ENGINEER | SKILL | TIME NEEDED | SERVICE CHARGE | RESIDING STATION |
|---|---|---|---|---|---|
| ○ 1 | OYAMA ○○ | A | 3.0 HOURS | ¥XXXXX | HIROSHIMA |
| ○ 2 | OMOTO ORO | C | 3.2 HOURS | ¥XXXXX | KUMAMOTO |
| ◎ 3 | OKAWA OHIKO | B | 4.5 HOURS | ¥XXXXX | OITA |
| ⋮ | ⋮ | ⋮ | ⋮ | ⋮ | ⋮ |

(NOTES)
PLEASE BE ADVISED THAT THESE DATA BE CHANGED DEPENDING ON TRANSPORTATION INFORMATION AND THE LIKE THEREAFTER.

PLEASE, SELECT REQUIRED SERIVICE AND PUSH DISPATCH.

DISPATCH

OPTIMUM SERVICE SELECTION ASSISTING SYSTEM

This application is a Continuation Application of PCT International Application No. PCT/JP03/01846 filed on Feb. 20, 2003, which designated the United States.

FIELD OF THE INVENTION

The present invention relates to an optimum service selection assisting system, a server, a terminal, a recording medium, a program, a program recording medium, and a method for processing an optimum service selection assisting system; and, more particularly, to an optimum service selection assisting system for performing an optimum service assist for satisfying user's needs out of services such as maintenance, repair, and the like of a user's tool, apparatus, or the like, on the basis of information on a staff providing service, service charge, and the like.

BACKGROUND OF THE INVENTION

Conventionally, in case when a specific service such as maintenance or repair for a user's apparatus is required, the user used to make a contact with the nearest service station, e.g., by phone, to get the service required as soon as possible. Then, a service staff from the corresponding service station, e.g., service engineer, visits the user to provide services such as maintenance and the like, in response to the request from the user.

However, there may be a case when the user cannot get an immediate service needed since there is nobody currently available at the nearest service station and it will take too long for anybody to come to the user to give the service needed because everybody at the station is too busy. In this case, it may be quicker for the user to get a service from a remote service station, but it hasn't been easy for the user to obtain any information in this regard.

Further, if once a semiconductor manufacturing apparatus or the like is out of order, it has to be stopped running for a long time while it being repaired, thereby resulting in deterioration of throughput. Therefore, it will be natural for a user to have the service such as repair provided as soon as possible such that a processing yield of the semiconductor can be enhanced and a level of a predetermined throughput can be maintained.

Still further, apparatus may have a complicated construction and there may be differences in the kinds of service to be offered, the times required for the service, or the like, depending on the capacity level of the service engineer, e.g., ability or skill. Accordingly, there certainly must be a user who wants to have a choice to select a service engineer.

Still further, there may be a user who prefers to select the service based on the service charge rather than the time or the capacity level of the service engineer; and there may be a user who wants to select an optimum service determined based on a combination of the aforementioned information.

As described above, the user's needs vary widely and there has been a strong demand for a development of an assisting system which will help for the user to select an optimum service satisfying needs.

SUMMARY OF THE INVENTION

Therefore, the present invention is contrived to solve the problems. It is an object of the present invention to provide an optimum service selection assisting system in which a user can readily collect basic standard information to be used as criteria in selecting an optimum service that satisfies the user's needs best, e.g., information on a staff providing services such as maintenance or repair of the user's tool or apparatus, time information, service charge information, and the like; and also in which a service provider can reduce the cost.

For achieving the object, in accordance with one aspect of the present invention, there is provided an optimum service selection assisting system, including: a server for performing a service selection assist for a user; a terminal of the user connected to the server through a network; a user information storage unit for storing at least place information of the user; a staff information storage unit for storing at least place information of each staff providing a service as staff information; and a transportation information storage unit for storing at least transportation facility time information and transportation cost information, wherein the terminal sends a service list request information having at least user specific information to the server and displays a service list in a display unit when receiving service list information from the server, and wherein the server, when receiving the service list request information from the terminal, searches and collects the place information of the user from the user information storage unit on the basis of the user specific information received, and, at the same time, collects the place information of each staff providing the service from the staff information storage unit; determines move time and transportation cost for each staff to get to the user at the time of the service list request information being generated, on the basis of the transportation facility information and the transportation cost information from the transportation information storage unit; calculates time needed for the staff to start providing a service at a place where the user is located on the basis of the determined move time and, at the same time, calculates service charge on the basis of the determined transportation cost; and creates service list information, which relates at least the time needed and the service charge for each staff, and sends same to the terminal.

By this, in case when a user needs a service such as maintenance or repair for his/her tool, apparatus, or the like, the user can readily obtain basic standard information that can be used as criteria for selecting the service by simply requesting only the service list. In particular, the time needed for the staff to start providing a service at a place where the user is located and the service charge are displayed with a list for each staff providing services, so that the user can select an optimum service matching his/her needs best, namely, preference for a service staff available with shortest waiting time or preference for a service provided at a lowest fee. Meanwhile, the service provider can dispatch a staff for providing the service efficiently by a selection of the optimum service to thereby reduce the cost.

Further, it is preferable that the staff information storage unit further stores, as staff information, capacity level information of each staff and specialty fee information corresponding to the capacity level; and the server, when receiving the service list request information, further collects the specialty fee information of each staff from the staff information storage unit, calculates the service charge of each staff by adding the specialty fee information to the transportation cost information, and creates the service list information relating the capacity level information for each staff. In such a configuration, the user can choose a service by a capacity level such as skillfulness or technical ability of a staff providing services, to thereby select a high level service. On the other hand, the service provider can make use of a staff efficiently, and, at the same time, provide a high level service with a reasonable service charge corresponding to the capacity level.

Still further, it may be allowed that the staff information storage unit further stores information on whether each staff is available or not, and the server, when creating the service list information, further creates the service list information for every staff available to be dispatched to the user at the time of the service list request information being generated from the terminal, on the basis of the information on availability of each staff from the staff information storage unit. Accordingly, from the service list information for the staff, a user can find out who is available in the service station for a service at the user's place at the time when the service list request information is generated. Therefore, the user can save time for inquiring whether or not a staff is available in the service station, thereby facilitating the selection of a staff for the service efficiently. Meanwhile, the service provider can improve the efficiency for staff management.

Still further, a component cost information storage unit for storing at least component cost information needed for providing the service is further included, and it may be allowed that the service list information sent from the terminal further has service information that the user wants; and the server, when calculating the service charge, further collects the component cost information needed for the service from the component information storage unit on the basis of the service information that the user wants, which is received from the terminal, and calculates the service charge by including the component cost information. By such a configuration, service charge containing the component cost needed for a service is suggested, so that it can be determined whether or not the charge for the selected service closely reflects the realistic cost for the service required.

At this time, a component delivery information storage unit for storing at least delivery time information and delivery cost information is further included, and it may be allowed that the server, when calculating the time needed and the service charge, collects time information and cost information required for delivering the component needed for the service that the user wants to the place where the user is located, on the basis of the delivery time information and the delivery cost information from the component delivery information storage unit, and calculates the time needed by including the delivery time information and the service charge by including the cost information required for the delivery. By such a configuration, the time required including the delivery time and the service charge containing the delivery cost of the component required for the service can be known, so that it can be determined whether or not the service is selected at a service charge or time further closely reflecting realistic cost or time for the service required.

Still further, it may be allowed that the service list information that the terminal sends further has information on a priority item in the service list; and the server rearranges the created service list information on the basis of the information on the priority item and sends a rearranged list information to the terminal. By this, the service list information is rearranged in such a way that a priority item in the cost, time, capacity level, and the like is sorted out by a key in accordance with the user's preference. As a result, the service list may be rearranged in order of cost from low to high, in order of waiting time for the service, from short to long, or in order of capacity level, from high to low. Thus, a best service matching with the user's demand can be selected more simply.

Still further, it may be allowed that the terminal sends to the server service dispatch request information which includes service information selected from the service list information sent from the server; and the server dispatches the selected service in response to the service dispatch request information from the terminal. By doing this, it is possible to automatically dispatch the service selected by the user.

For achieving the object, in accordance with another aspect of the present invention, there is provided a server for performing a service selection assist for a user, wherein the server is formed such that information needed is obtained from a user information storage unit connected to at least a terminal of a user through a network and storing at least place information of the user, a staff information storage unit for storing place information of each staff providing a service as staff information, and a transportation information storage unit for storing at least transportation facility time information and transportation cost information; and the server, when receiving service list request information from the terminal, searches and collects the place information of the user from the user information storage unit on the basis of user specific information received from the terminal, and, at the same time, collects the place information of the staff providing the service from the staff information storage unit; determines move time and transportation cost needed for the staff to get to the user at the time of the service list request information being generated, on the basis of the transportation facility time information and the transportation cost information from the transportation information storage unit; calculates time needed for the staff to start providing a service at a place where the user is located on the basis of the determined move time, and, at the same time, calculates a service charge on the basis of the determined transportation cost; and creates the service list information, which relates at least the time needed and the service charge for each the staff, and sends same to the terminal.

By this, it is possible to readily provide to the user the information which can be used as criteria to select a service from the service list. Accordingly, the user can select an optimum service matching his/her needs best and the service provider can reduce the cost.

For achieving the object, in accordance with still another aspect of the present invention, there is provided a terminal, being connected to at least a server for performing a service selection assist for a user through a network, sending a service list request information having at least a user specific information to the server and displaying the service list in a display unit when receiving the service list information from the server. By this, the user can readily obtain the information which can be used as criteria to select a service by simply requesting the service list. Therefore, the user can select an optimum service matching his/her needs best and the service provider can reduce the cost.

For achieving the object, in accordance with still another aspect of the present invention, there is provided a program for performing a service selection assist for a user, wherein the program runs on a computer and works with a server; wherein the server is connected to at least a terminal of a user through a network, and formed such that information needed is obtained from a user information storage unit for storing at least place information of a user, a staff information storage unit for storing place is information of a staff providing a service as staff information, and a transportation information storage unit for storing at least transportation facility time information and transportation cost information; and wherein the program allows the server to search and collect the place information of the user from the user information storage unit, when receiving a service list request information from the terminal, on the basis of user specific information received form the terminal and, at the same time, collect the place information of each staff providing the service from the staff information storage unit; to determine move time and transportation cost needed for each staff to get to the user at the time of the service list request information being generated, on the basis of the transportation facility time information and the transportation cost information from the transportation information storage unit; to calculate time needed for the staff to start providing a service at a place where the user is located on the basis of the determined move time and, at the same time, calculate a service charge on the basis of the determined transportation cost; and to create a service list information, which relates at least the time needed and the service charge for each staff, and send same to the terminal. By this, information which can be used as criteria to select a service can be readily provided to the user in response to the service list request such that the user can select an optimum service matching his/her needs best, and the service provider can reduce the cost.

For achieving the object, in accordance with still another aspect of the present invention, there is provided a computer-readable recording medium storing a program for performing a service selection assist for a user, wherein the program runs on a computer and works with a server apparatus; wherein the server is connected to at least a terminal of a user through a network, and formed such that information needed is obtained from a user information storage unit for storing at least place information of a user, a staff information storage unit for storing place information of a staff providing a service as staff information, and a transportation information storage unit for storing at least transportation facility time information and transportation cost information; and wherein the program allows the server to search and collect the place information of the user from the user information storage unit, when receiving a service list request information from the terminal, on the basis of user specific information received and, at the same time, collect the place information of each staff providing the service from the staff information storage unit; to determine move time and transportation cost needed for each staff to get to the user at the time of the service list request information being generated, on the basis of the transportation facility time information and transportation cost information of the transportation information storage unit; to calculate time needed for the staff to start providing the service at a place where the user is located on the basis of the determined move time and, at the same time, calculate a service charge on the basis of the determined transportation cost; and to create a service list information, which relates at least the time needed and the service charge for each staff, and send same to the terminal. By this, information which can be used as criteria to select a service from the service list can be provided to the user in response to the service list request, so that the user can select an optimum service matching his/her needs best and the service provider can reduce the cost.

For achieving the object, in accordance with still another aspect of the present invention, there is provided a method for processing an optimum service selection assisting system including: a server for performing a service selection assist for a user, a terminal of a user connected to the server through a network, a user information storage unit for storing at least place information of a user, a staff information storage unit for storing at least place information of a staff providing a service, and a transportation information storage unit for storing at least transportation facility time information and transportation cost information, wherein the terminal sends a service list request information including at least user specific information to the server and displays a service list in a display unit when receiving service list information from the server, and wherein the server, when receiving the service list request information from the terminal, searches and collects the place information of the user from the user information storage unit, on the basis of the user specific information received, and, at the same time, collects the place information of each staff providing the service from the staff information storage unit; determines move time and transportation cost needed for each staff to get to the user at the time of the service list request information being generated, on the basis of the transportation facility time information and transportation cost information of the transportation information storage unit; calculates time needed for the staff to start providing the service at a place where the user is located on the basis of the determined move time, and, at the same time, calculates service charge on the basis of the determined transportation cost; and creates a service list information, which relates at least the time needed and the service charge for each staff, and sends same to the terminal.

By such a configuration, the user can readily obtain information which can be used as criteria to select a service by simply requesting the service list. Accordingly, the user can select an optimum service matching his/her needs best and the service provider can dispatch a staff for providing services efficiently by a selection of the optimum service to thereby reduce the cost.

For achieving the object, in accordance with still another aspect of the present invention, there is provided a method for processing a server, wherein the server is connected to at least a terminal of a user through a network, and collects information needed from a user information storage unit for storing at least place information of a user, a staff information storage unit for storing place information of a staff providing a service as staff information, and a transportation information storage unit for storing at least transportation facility time information and transportation cost information, the method including the steps of: searching and collecting the place information of the user from the user information storage unit, when receiving a service list request information from the terminal, on the basis of user specific information received from the terminal and, at the same time, collecting the place information of each staff providing the service from the staff information storage unit; determining move time and transportation cost needed for each staff to get to the user at the time of the service list request information being generated, on the basis of the transportation facility time information and transportation cost information of the transportation information storage unit; calculating the time needed for the staff to start providing the service at a place where the user is located on the basis of the obtained moves time and, at the same time, calculating a service charge on the basis of the obtained transportation cost; and creating a service list information, which relates at least the time needed and the service charge for each staff, and sending same to the terminal. By this, information which can be used as criteria to select a service can be easily provided to the user in response to the service list request, so that the user can select an optimum service matching his/her needs best and the service provider can reduce the cost.

BRIEF DESCRIPTION OF THE DRAWINGS

The above and other objects and features of the present invention will become apparent from the following description of preferred embodiments, given in conjunction with the accompanying drawings, in which:

FIG. 4 sets forth a view for showing an example of a service list data table in accordance with a preferred embodiment of the present invention;

FIG. 5 presents a view for showing an example of a user information management database in accordance with a preferred embodiment of the present invention;

FIG. 6 provides a view for showing an example of a staff information management database in accordance with a preferred embodiment of the present invention;

FIG. 7 describes a view for showing an example of a component information management database in accordance with a preferred embodiment of the present invention;

FIG. 9 offers a view for showing an example of contents menu screen displayed in a display unit of a terminal in accordance with a preferred embodiment of the present invention;

FIG. 10 shows a view for showing an example of a screen of a service list request form displayed in a display unit of a terminal in accordance with a preferred embodiment of the present invention;

FIG. 11 explains an operation in case where data is inputted to the service list information data table in accordance with a preferred embodiment of the present invention; and FIG. 12 sets forth a view showing an example of a screen of service list information displayed in a display unit of a terminal in accordance with a preferred embodiment of the present invention.

DETAILED DESCRIPTION OF THE PREFERRED EMBODIMENT

Figure 1:
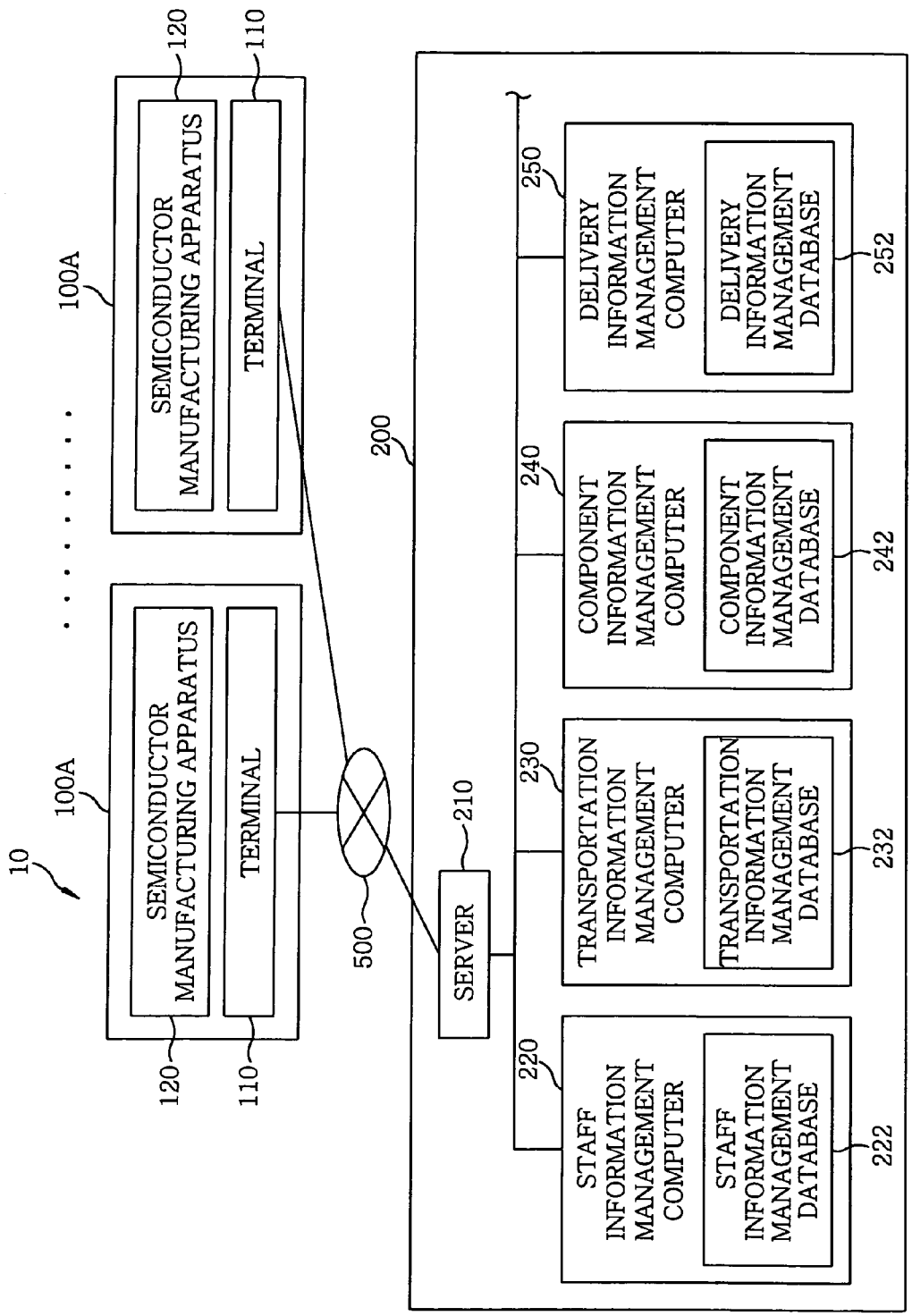
FIG. 1 offers a block diagram for showing a configuration of an optimum service selection assisting system in accordance with a preferred embodiment of the present invention.

Hereinafter, preferred embodiments of an optimum service selection assisting system in accordance with the present invention will be described in detail with reference to the accompanying drawings. Further, like reference numerals will be assigned to like parts having substantially same functions, and redundant description thereof will be omitted in the specification and the accompanying drawings.

Now, an optimum service selection assisting system and a method thereof will be explained. In a preferred embodiment, a service subject will be described, wherein a user selects repair, maintenance, and the like of a semiconductor manufacturing apparatus.

FIG. 1 shows a configuration of a system in accordance with a preferred embodiment of the present invention. In an optimum service selection assisting system 10 in accordance with the preferred embodiment of the present invention, semiconductor manufacturing factories 100A, 100B, . . . 100N corresponding to a user of the semiconductor manufacturing apparatus are connected to a vendor 200 for performing, e.g., service selection assist such as repair or maintenance of the semiconductor manufacturing apparatus through the Internet 500 of a network capable of two-way communication.

In the factories 100A, 100B, . . . 100N, each factory 100 includes a terminal 110 as a user-side terminal and a semiconductor manufacturing apparatus 120. The terminal 110 and the semiconductor manufacturing apparatus 120 may be connected to each other by network, e.g., LAN, or be installed, individually. Further, the kinds and the number of the semiconductor manufacturing apparatus 120 in each of the factories 100A, 100B, . . . 100N may vary depending on the factory. For example, it may be an apparatus for performing various processes, such as etching, film forming process, ashing, sputtering, or the like. In addition, it may be a multi-chamber type manufacturing apparatus, so-called a cluster apparatus, capable of performing a plurality of processes in one apparatus. Meanwhile, the terminal 110 may be connected to the Internet 500, e.g., through a provider (not shown) or a computer serving as the terminal 110 as well as a server.

The vendor 200 includes a server 210 as a server; a staff information management computer 220 for managing the staff information of the service engineer (maintenance staff) providing services such as maintenance or repair of the semiconductor manufacturing apparatus; a transportation information management computer 230 for managing the transportation information; a component information management computer 240 for managing inventory information of the component (parts); and a delivery information management computer 250 for managing the delivery information of the parts. And, the computers described above are connected to each other through intra-company network. Each of the computers 220, 230, 240, and 250 may be considered as a computer installed in each part of the vendor 200 and each operation branch, and the number of computers is not limited thereto. The server 210 is connected to, e.g., the Internet 500, which is a network capable of two-way communications.

Figure 2:
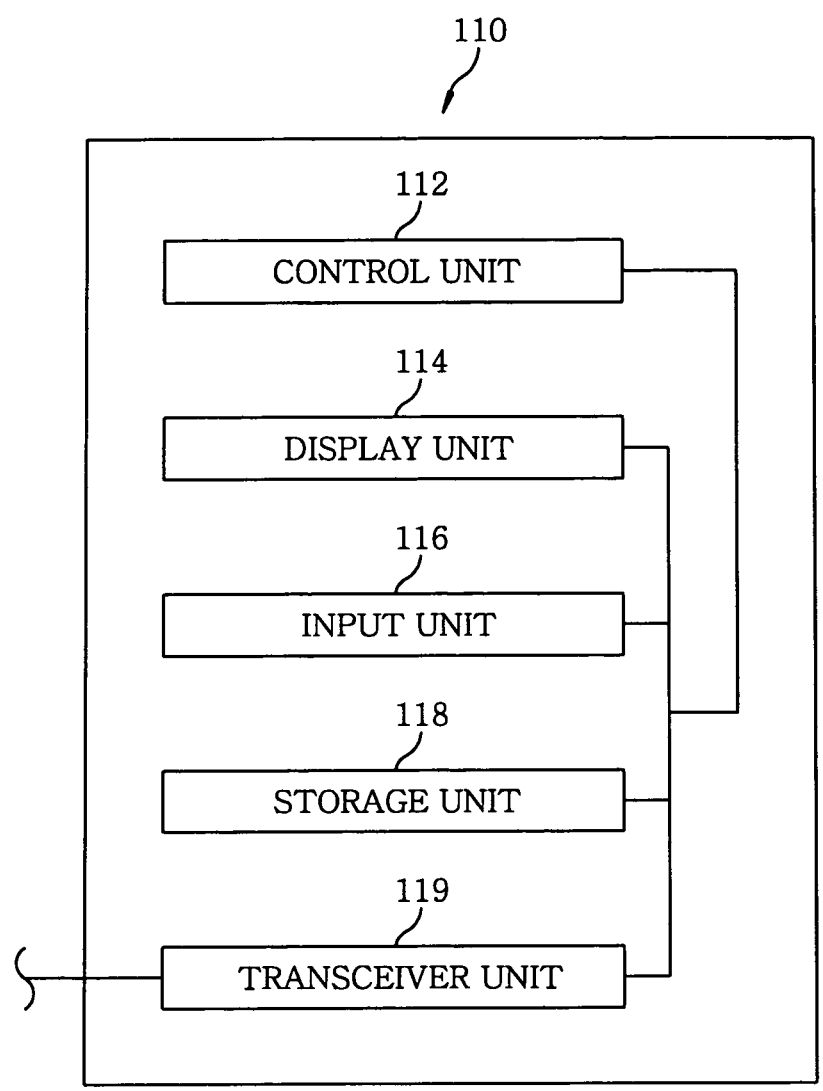
FIG. 2 shows a block diagram for showing a configuration of a terminal in accordance with a preferred embodiment of the present invention.

As shown in FIG. 2, the terminal 110 of the factory 100 includes a control unit 112 having memories such as CPU (central processing device), ROM, RAM, and the like; a display unit 114, e.g., a display, showing contents sent from the server 210 of the vendor 200; an input unit 116 for inputting various data; a storage unit 118 for storing information, program, and the like received from the server 210; and a transceiver unit 119 for performing a transmission and a reception of the information (data) to/from the server through the Internet 500. The memory of the control unit 112 is where a program or a data to be accessed by CPU is stored. For example, a program memorized in the storage unit 118 is read and stored therein whenever necessary.

Figure 3:
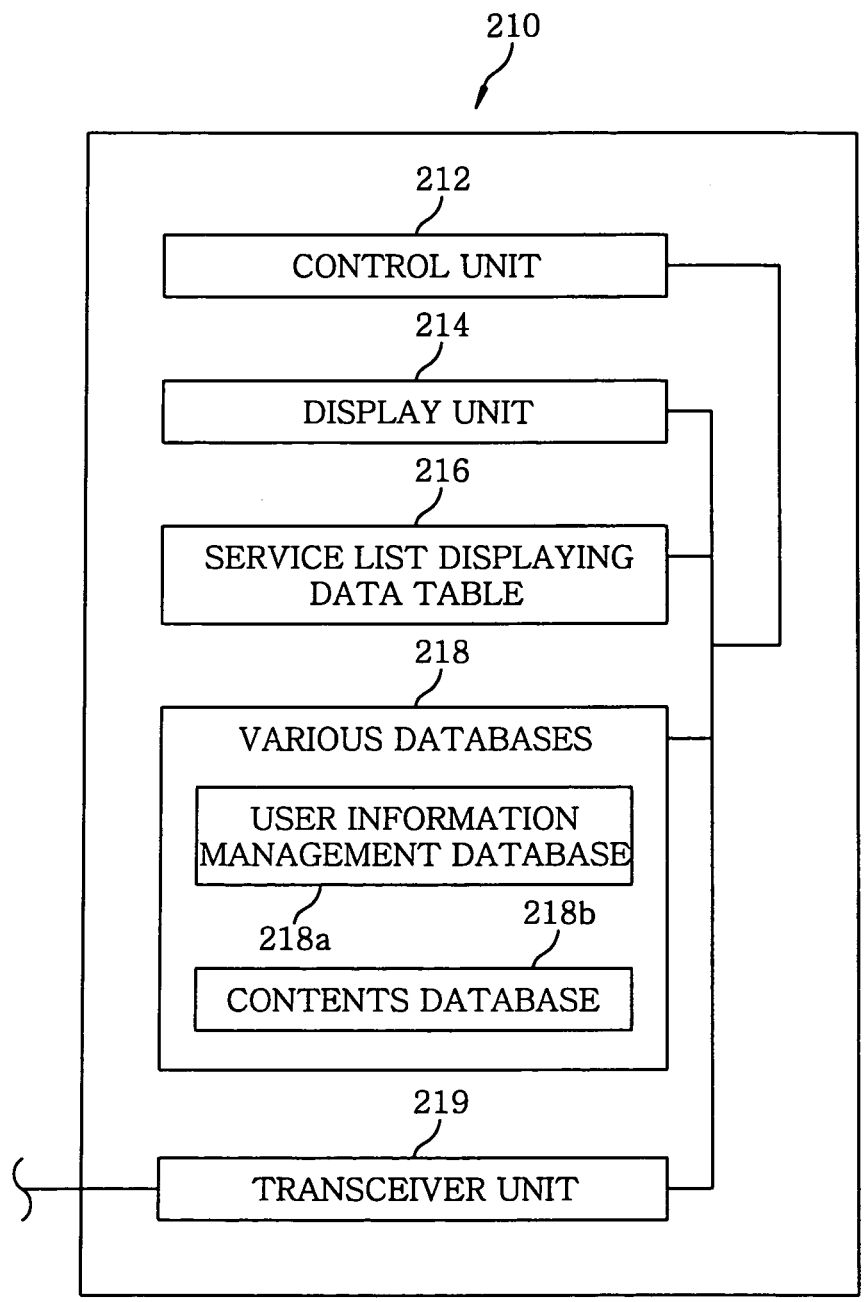
FIG. 3 explains a block diagram for showing a configuration of a server in accordance with a preferred embodiment of the present invention.

As shown in FIG. 3, the server 210 of the vendor 200 has a control unit 212 having memories such as CPU (central processing device), ROM, RAM, and the like; a display unit 214, e.g., display; a service list displaying data table 216 for creating the service list, e.g., maintenance; various databases 218; and a transceiver unit 219 for performing a transmission and a reception of the information (data) to/from the server through the Internet 500. The memory of the control unit 212 is a medium where a program or a data to be accessed by CPU is stored. For example, the memory is read from the program storing database of various databases 218 as required and stored therein.

As shown in FIG. 4, in the service list displaying data table 216, there are several items, such as a selection number of the service selected by user, name of the service engineer, skill of the service engineer, waiting time till the service being provided to the user individually, service charge, residing station of the service engineer, and the like.

As for the various databases 218, there are user information management database 218a, which is the user information storage unit for storing the information on the user receiving the service such as maintenance of the semiconductor manufacturing apparatus, contents database 218b, and the like. As shown in FIG. 5, in the user information management database 218a, there are memorized user name such as company name (allowed to contain a factory name), place where the user's company is located, e.g., city and state, user's ID, password, address, nearest station from the user, note, and the like. In the note, the name of the semiconductor manufacturing apparatus belonging to the company is memorized, for example.

In the contents database 218b, contents are stored, e.g., HTML file, graphical•icon•file such as GIF file and the like, and hypertext object such as voice and image objects, which are provided by the server 210. For example, these objects are provided to each terminal 110 through the Internet 500, and displayed by the display unit 214 of the terminal 110.

The staff information management computer 220 has a staff information management database 222 as a staff information storage unit. As shown in FIG. 6, in the staff information management database 222, the staff information is memorized, such as name of the service engineer (maintenance staff), skill of the staff capacity level, specialty fee corresponding to the skill level in case where the staff performs a service such as maintenance, name of the service station where the staff is available address of the service station, the nearest station from the residing station, availability, and the like. The skill is indicated as A, B, C, or the like, by evaluating, e.g., skillfulness, technical ability, experience, and knowledge. And, the specialty fee is set and memorized depending on the skill. Further, the availability is indicated as "available" in case where the staff is available in the station at present, and "not available" in case where the staff is away on business and not available.

The transportation information management computer 230 has a transportation information management database 232 as a transportation information storage unit. For example, in the transportation information management database 232, there are memorized transportation facility time information and transportation cost information. The transportation facility time information contains timetable information, transfer arrangement information, vacancy information of each transportation facility such as train, airplane, and the like, and the transportation cost information contains cost information of each transportation facility. In the transportation information management computer 230, the times and transportation cost needed for the staff to get to the user place are calculated on the basis of the transportation facility time information and cost information memorized in the transportation information management database 232, and then, the results are referred back to inquirer in case when there are questions about the times and transportation costs on the basis of the information on departure and arriving stations. Further, the transportation information management database 232 may contain traveling route, distance, expressway toll fee, and times needed when traveling from each station to the user's factory by car. Also, in addition to the information by way of plane or train, the times needed for traveling by car may be suggested.

The component information management computer 240 has a component information management database 242 as a component information storage unit. As shown in FIG. 7, in the component information management database 242, there are memorized part number, part name, the number, price, warehousing date, expected warehousing date, and the like. In the warehousing date out of these, there is memorized the date when components were stocked. It is known from the number whether there is inventory or not. For example, if the number is '0', it means that there is no inventory. In the case of no inventory, as described above, e.g., the expected warehousing date should be remembered.

The delivery information management computer 250 has a delivery information management database 252 as a component delivery information storage unit. In the delivery information management database 252, there is memorized the information on the delivery state, time, and cost. In the delivery information management computer 250, the time and cost required for delivering the component to the receiver location are calculated on the basis of the information on delivery time and cost memorized in the delivery information management database 252, and then, the results are referred back to the inquirer, in case that there are questions about the delivery time and cost on the basis of the information on the receiver location and the sender location.

Meanwhile, the database 218 of the server 210, and the database 222, 232, and 242 of computers 220, 230, and 240 are updated with new information from operation branches having the server or computer, respectively. In addition, the computers 220, 230, 240, and 250 send the information from the database 222, 232, and 242 to the server 210, respectively, through, e.g., intra-company network, in response to the questions from the server 210. Therefore, the server 210 can obtain the information from each database 222, 232, and 242, as required.

Figure 8:
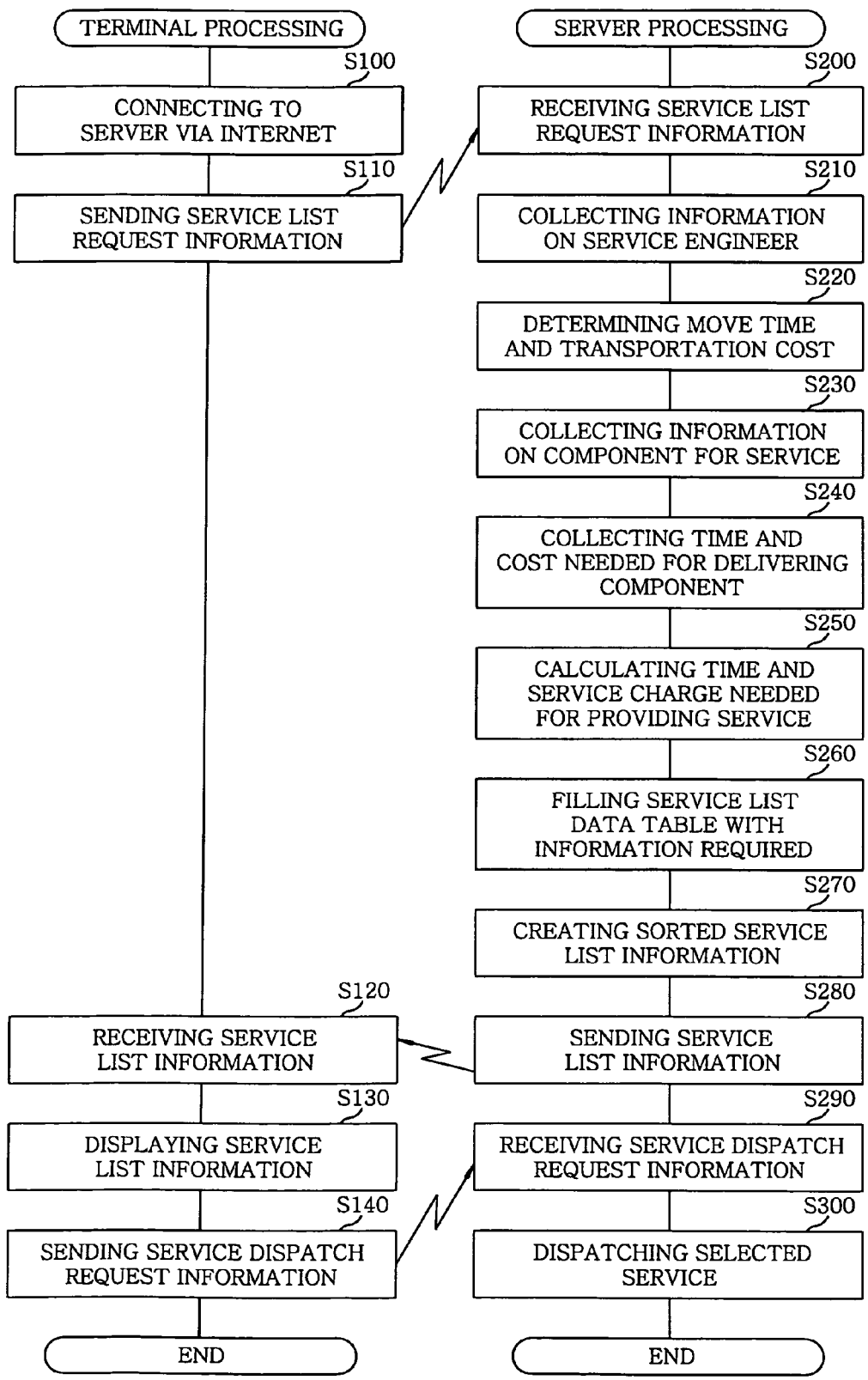
FIG. 8 depicts a flowchart for showing an operation of the system in accordance with a preferred embodiment of the present invention.

Next, an operation flow of an optimum service selection assisting system in accordance with a preferred embodiment of the present invention will be explained with reference to FIG. 8. FIG. 8 is a flowchart for showing such an operation that the server 210 creates a service list in response to a service list request information from the terminal 110, provides same to the terminal 110, and dispatches a service selected in response to the request for the service dispatch from the terminal 110. Further, such an operation of the system can be carried out typically by a program recorded in a recording medium, e.g., a hard disk device.

At first, in step S100, the terminal 110 is connected to the server 210 through, e.g., the Internet 500. For example, the terminal 110 may be connected by accessing a site provided by the server 210 of the vendor 200 of the present embodiment, the site being provided through a provider contents page, the site on net, or the like. At this time, the menu screen containing the service list request such as maintenance, as shown in FIG. 9, is displayed in the display unit 214 of the terminal 110. In the menu screen, there are explanations for the semiconductor manufacturing apparatus and the service provided, and the service list request such as maintenance, repair or the like. In a case of selecting the service list request out of these, the service list request screen shown in FIG. 10 is displayed. For example, in the service list request screen, there are displayed fields for inputting required information such as user ID, password, kinds of service desired, and priority item of the service list, and a display button of the service list request.

In the contents menu shown in FIG. 9, if 'the explanation of the service provided is selected, the list and explanation of the kinds of the service are displayed in the screen. Thus, the kinds of the service may be selected out of these.

As an input information, there may be "abnormality of RF system", "abnormality of intake/exhaust system" and the like when the semiconductor manufacturing apparatus is the one for which the service, e.g., repair, is requested. The priority item of the service list corresponds to a key item when the service list being sorted out, and the user can select time, skill, cost or the like freely.

Continuously, if all the required information is inputted to the fields and the display button of the service list request is pushed (clicked by, e.g., a point device), the terminal 110 sends such information as the request information to the server 210 of the vendor 200 at step S110.

Subsequently, if the server 210 receives the service list request information from the terminal 110 at step S200, it collects the information for creating the service list through, e.g., intra-company network, on the basis of the information memorized in each of the databases 222, 232, 242, and 252, by inquiring to each of the computers 220, 230, 240, and 250 (steps S210 to S240).

At first, the server 210 collects the information on a service engineer (maintenance staff), who is currently available at the residing station, from the staff information management computer 220 at step S210. Specifically, the server 210 acquires the information on the name and skill as capacity level of the service engineer (maintenance staff) now available at the residing station, specialty fee, name of the residing station, the nearest station from the residing station, and the like, from the staff information management database 222.

Further, the server 210 collects the information on time and transportation cost needed for the service engineer to get to the user place, from the transportation information management computer 23.0 at step S220. For example, the server 210 sends the information on departure and arrival stations to the transportation information management computer 230 and inquires the time and transportation cost for the service engineer to get to the user, wherein the arrival station is the nearest station from the user, which is searched by the user information management database 218a (one example for the place information of the user) on the basis of the user ID, and the departure station is the nearest station from the residing station of the service engineer (one example for the place information of each staff). If the transportation information management computer 230 receives the information on the departure and arrival stations, it calculates the transportation costs and the times needed for the staff to get to the user place on the basis of the transportation facility time information memorized in the transportation information management database 232, in response to the inquiries, and then, sends these information to the server 210. As a result, the server 210 acquires the information on the transportation costs and the times needed for each staff to reach the place where the user is located. At this time, a plurality of transportation costs and times needed should be combined even though the service engineer is one person, since the transportation costs and times needed are different depending on the kinds of transportation facility used, e.g., plane, train, or the like.

In addition, at step S230, the server 210 acquires the information on the component required for the service from the information on the kinds of the service requested by the user which is given in the service list request information from the component information management computer 240, e.g., component cost, inventory status, and the like, on the basis of the component information management database 242.

Specifically, in a case of "abnormality of RF system" as the kinds of the service requested, the information on "RF device" as the component is obtained. Further, if there is no inventory of the component, the information on warehousing data is obtained as, e.g., warehousing temporary information.

In addition, at step S240, the server 210 records the information on the time and cost for delivering the component to the place where the user is located from the delivery information management computer 250. For example, the server 210 inquires the time and cost needed for delivery of components needed in the service requested by sending the information on the components and on the nearest station from the user, which is obtained by searching the user information management database 218a based on the user ID needed for the service requested, as the receiver location information to the delivery information management computer 250. If the delivery information management computer 250 receives the information on the component and the receiver location, it calculates the time and cost needed for delivering the component to the user on the basis of the delivery time and cost information memorized in the delivery information management database 252, wherein as for the information on the sender location, the nearest station from the management station for managing the component is used, in response to the inquires.

Next, at step S250, the server 210 calculates the time needed for each service engineer (maintenance staff) to start providing services at a place where the user is located, and the service charge when the service engineer provides the service, on the basis of the information obtained by each of the computers 220, 230, 240, and 250.

For example, the needed time for the staff to get to the user place is compared with that for delivering the component and the longer one is selected as the needed time. The service charge is a sum of, e.g., the specialty fee based on the skill of the service engineer, the transportation cost, the component cost, and the delivery cost.

Subsequently, at step S260, respective items of the service list displaying data table 216 are filled, on the basis of the information obtained from respective computers 220, 230, 240, and 250, and the calculation result. Specifically, the service list displaying data table 216 is filled with data required for the items thereof, such as selection number of the service that the user selects, name of the service engineer, skill of the service engineer, the time needed for the staff to start providing the service at a place where the user is located, the service charge, and the residing station of the service engineer, and the like. The selection number of the service in such items refers to the number for specifying the service, and it is the consecutive numbers. Further, as for the information on the name, skill, and residing station of the service engineer, the information from the staff information management database 222 of the staff information management computer 230 is inputted. As for the time needed for the staff to start providing the service at a place where the user is located and the service charge, the result calculated at step S250 is inputted.

Thus, if the server 210 inputs the information required for the service list displaying data table 216, the service list is created on the basis of the information inputted to the service list displaying data table 216, at step S270. Here, in case where the time is selected as priority item of the service list, the service list is rearranged (sorted) in order of the length, starting from shorter to longer time order, of the time needed for the staff to start providing the service at a place where the user is located. In case where the skill is selected, the service list is rearranged generally in order of the skill, from high to low level order, i.e., the capacity level of the service engineer. In case where the cost is selected, the service list is rearranged in order of the service charge, usually from low to high order. FIG. 11 shows an example for the service list information by sorting in order of the needed time.

Meanwhile, before sorting the service list, the service charge and the like which are more expensive than a predetermined charge may be removed. Therefore, it is possible to prevent the transportation cost from becoming too expensive, which depends on a selection of the transportation facility.

Continuously, at step S280, the server 210 sends the service list information to the terminal 110. When the terminal 110 receives the service list at step S120, the display unit 114 displays the service list at step S130. Accordingly, the user can choose an optimum service preferred. FIG. 12 shows an example of the service list display screen. In the service list display screen, there are displayed a field for selecting the service list and a dispatch button for dispatching the selected service.

In addition, if one service from the service list is selected and the dispatch button is pushed (clicked by, e.g., the point device), the terminal 110 sends the dispatch request information containing the selected service information to the server 210, at step S140. The server 210 receives the service arrangement request information from the terminal 110 at step S290, and dispatches the service selected in response to the service dispatch request information. For example, the server 210 sends a notice of dispatching the service engineer of the selected service to the staff information management computer 220. In addition, the server 210 sends a notice of dispatching the ticket of the using transportation facility.

Further, the server 210 sends a notice of dispatching the component required. Still further, it sends a notice of dispatching the delivery of the component required. As a result, each of the computers 220, 230, 240, and 250 performs a dispatching process, e.g., notification to a related post in accordance with each of the notices. By this, it is possible to automatically dispatch the selected service to the user. Therefore, the service engineer providing the service such as the selected maintenance or repair can provide the optimum service requested by the user in the user place.

As described above, in case the service such as maintenance, repair or the like for the user's semiconductor manufacturing apparatus 120 is needed, the user inputs information needed for the service request from the terminal 110 and sends the service list request information to the server 210 of the vendor 200 via the Internet 500. By such a simple operation, the user can readily obtain the information that can be used as criteria to select the service, since the service list of the time and cost needed for the user to receive the service by the staff (e.g., service engineer, maintenance staff, etc.) providing services is displayed in the display unit 114 of the terminal 110, for each staff.

Particularly, since the time and cost needed for the user to get the service are displayed, for each staff providing services, the user can select an optimum service matching his/her needs best, namely, an immediate service or a service at a lower fee.

For example, in case where the user wants to take the service more quickly, a service by a remote service engineer may be selected when it can be easily seen from the service list that a service engineer from a remote service station can get to the user more quickly than a service engineer from the nearest service station.

Meanwhile, a service provider can dispatch a staff for providing services efficiently by a selection of the optimum service, so that it is possible to reduce the cost.

Further, the user can choose a service based on the capacity level such as skillfulness or technical ability of the staff providing services to thereby select the high quality service, since the service list displays the capacity level of the staff providing services and suggests the service charge containing specialty fee corresponding to the capacity level. On the other hand, the service provider can make use of the staff efficiently, and, at the same time, provide a high level service with a reasonable service charge reflecting the level.

Still further, the service list information is created for a staff, who is available in the service station and can be dispatched to the place where the user is located, by using the information on whether each staff is available in the home service station or not due to the business trip at the time when the service list request information is generated. Accordingly, the user can save the time for inquiring the availability of a staff in the service station, and thus select the staff efficiently. Meanwhile, the service provider can make use of the staff efficiently.

Still further, the service charge containing the component cost needed for the service is suggested in the service list information such that it can be determined whether or not the charge for the service selected closely reflects the realistic cost for the service rendered. In addition, the time including the delivery time or service charge including cost of the component required for the service is suggested, so that it can be determined whether or not the service is selected at the service charge or time closely reflecting a realistic charge or time required for the service.

Still further, the service list information is rearranged (sorted) such that a priority item in the cost, time, capacity level, and the like becomes a key. As a result, the service list is created in order of the service charge, in order of the time needed for the staff to start providing the service, and in order of the capacity level. Thus, the user can choose the service matching his/her needs best more simply.

While the invention has been shown and described with respect to the preferred embodiments, it is not limited thereto. It will be understood by those skilled in the art that various changes and modifications may be made without departing from the scope of the invention as defined in the following claims.

For example, there may be installed inside the server 210 corresponding to the server, or independently installed from the server and connected thereto through an intra-company network or public line, e.g., the Internet, the user information management database 218a corresponding to the user information storage unit, the staff information management database 222 corresponding to the staff information storage unit, the transportation information management database 232 corresponding to the transportation information storage unit, the component information management database 242 corresponding to the component information storage unit, and the component delivery information management database 252 corresponding to the component delivery information storage unit.

In accordance with the present invention, as mentioned above, in case a service such as maintenance or repair of the user's tool, apparatus, or the like is needed, the user can readily obtain the information that can be used as criteria to select the service, by simply requesting the service list only. In addition, the user can select an optimum service matching his/her needs best, namely, an immediate service or a service at a lower fee. Meanwhile, the service provider can dispatch the staff for providing the services efficiently by a selection of the optimum service, to thereby reduce the cost.

INDUSTRIAL APPLICABILITY

The present invention can be employed to an optimum service selection assisting system, a server, a terminal, a recording medium, a program, a program recording medium, and a method of processing the optimum service selection assisting system; and, more particularly, can be adopted to an optimum service selection assisting system for performing an optimum service selection assist corresponding to requirements, on the basis of the information on the staff providing services or service charge out of the services such as maintenance, repair, and the like of the user's tool, apparatus, or the like.

While the invention has been shown and described with respect to the preferred embodiment, it will be understood by those skilled in the art that various changes and modifications may be made without departing from the spirit and scope of the invention as defined in the following claims.

What is claimed is:

1. An optimum service selection assisting system, comprising:
    a server for performing a service selection assist for a customer receiving a service;
    a terminal of the customer connected to the server through a network, wherein the terminal sends service list request information having at least customer specific information to the server and displays a service list on a display unit of the terminal of the customer when receiving service list information from the server;
    a customer information storage unit that stores at least place information of the customer;
    a staff information storage unit that stores at least a current place information of each staff of a plurality of staff providing the service as staff information; and
    a transportation information storage unit for storing at least transportation facility time information and transportation cost information,
    wherein the server includes
    a control unit and a transceiver unit, the control unit being configured to, when receiving the service list request information from the terminal, the service list request information including priority information indicating which item in the service list is of greater priority to the customer,
    search and collect the place information of the customer from the customer information storage unit on the basis of the customer specific information received from the terminal,
    collect the current place information of each staff providing the service from the staff information storage unit,
    determine a component cost and a component delivery time for delivering the component at a time of request by the customer,
    determine move time for each staff to, at a time of request by the customer, get to the customer, the determination being made on the basis of the place information of the customer, the current place information of each staff, and the transportation facility time information from the transportation information storage unit,
    determine transportation cost for each staff to, at a time of request by the customer, get to the customer, the determination being made on the basis of the respective locations of each staff as compared with the location of the customer and the transportation cost information from the transportation information storage unit,
    calculate, for each staff, the time needed for each staff to start providing the service at a place where the customer is located, the time needed being determined on the basis of the determined move time, a current availability of each staff, and the component delivery time for the component, wherein the time needed for each available staff to start providing the service at the place where the customer is located corresponds to the component delivery time when the component delivery time is greater than the respective move time,
    calculate a customer service charge, which is generated on the basis of the determined transportation cost and the component cost,
    create service list information, which lists each available staff and indicates at least the time needed and the service charge for each staff to start providing the service at the place where the customer is located,
    send the service list information to the terminal of the customer via the transceiver unit for display,
    display the service list information on the terminal of the customer based on the priority information indicating which item in the service list is of greater priority to the customer, and
    receive a selection of one of the plurality of staff selected by the customer from the displayed service list information.

2. The optimum service selection assisting system of claim 1, wherein the staff information storage unit further stores, as staff information, capacity level information of each staff and specialty fee information corresponding to the capacity level, and
    wherein the control unit is configured to, when receiving the service list request information,
    collect the specialty fee information of each staff from the staff information storage unit;
    calculate the customer service charge of each staff by adding the specialty fee information to the transportation cost information; and
    create the service list information relating the capacity level information for each staff.

3. The optimum service selection assisting system of claim 1, wherein the staff information storage unit further stores information on whether each staff is available or not, and
    wherein the control unit is further configured to, when creating the service list information,
    create the service list information for every staff available to be dispatched to the customer at the time of the service list request information being generated from the terminal, on the basis of the information on availability of each staff from the staff information storage unit.

4. The optimum service selection assisting system of claim 1, further comprising a component cost information storage unit that stores at least the component cost needed for providing the service,
    wherein the service list request information sent from the terminal further includes service information that the customer wants, and
    wherein the control unit is configured to, when calculating the customer service charge, and
    determine the component cost needed for the service from the component information storage unit on the basis of the service information that the customer wants, which is received from the terminal.

5. The optimum service selection assisting system of claim 4, further comprising a component delivery information storage unit that stores at least the component delivery time and delivery cost information,
    wherein the control unit is configured to, when calculating the time needed and the customer service charge,
    collect time information and cost information required for delivering the component needed for the service that the customer wants to the place where the customer is located, on the basis of the component delivery time and the delivery cost information from the component delivery information storage unit, and calculate the time needed by including the component delivery time and the service charge by including the cost information required for the delivery.

6. The optimum service selection assisting system of claim 1, wherein the control unit is further configured to:
rearrange the service list information on the basis of the priority information, and
send the rearranged service list information to the terminal for display via the transceiver unit.

7. The optimum service selection assisting system of claim 1, wherein the terminal sends to the server service dispatch request information which includes service information selected by the customer receiving the service from the service list information sent from the server, and
wherein the control unit of the server is further configured to dispatch the selected service in response to the service dispatch request information from the terminal.

8. A server connected to a terminal of a customer through a network to perform a service selection assist for the customer receiving a service, comprising:
a control unit; and
a transceiver unit,
wherein the control unit obtains information from a customer information storage unit that is connected to at least the terminal of the customer through the network and that stores at least place information of the customer, from a staff information storage unit that stores current place information of each staff of a plurality of staff providing the service as staff information, from a transportation information storage unit that stores at least transportation facility time information and transportation cost information, and from a component information storage unit that stores component information, and
wherein the control unit is configured to, when receiving service list request information from the terminal of the customer, the service list request information including priority information indicating which item in the service list is of greater priority to the customer,
search and collect the place information of the customer from the customer information storage unit on the basis of customer specific information received from the terminal of the customer,
determine a component cost and a component delivery time for delivering the component on the basis of the component information received from the component information storage unit,
collect the current place information of the staff providing the service from the staff information storage unit;
determine move time needed for the staff to, at a time of request by the customer, get to the customer, the determination being made on the basis of the place information of the customer, the current place information of each staff, and the transportation facility time information from the transportation information storage unit,
determine transportation cost for each staff to, at a time of request by the customer, get to the customer, the determination being made on the basis of the respective locations of each staff as compared with the location of the customer and the transportation cost information from the transportation information storage unit,
calculate time needed for each staff to start providing the service at a place where the customer is located, the time needed being determined on the basis of the determined move time, a current availability of each staff, and the component delivery time for the component, wherein the time needed for each available staff to start providing the service at the place where the customer is located corresponds to the component delivery time when the component delivery time is greater than the respective move time,
calculate a customer service charge, which is in addition to the transportation cost, on the basis of the determined transportation cost and the component cost,
create service list information, which lists each available staff and indicates at least the time needed and the service charge for each the staff to start providing the service at the place where the customer is located,
send the service list information to the terminal of the customer via the transceiver unit for display,
display the service list information on the terminal of the customer based on the priority information indicating which item in the service list is of greater priority to the customer, and
receive a selection of one of the plurality of staff selected by the customer from the displayed service list information.

9. A program of instructions stored in a non-transitory storage medium readable by a computer to perform a service selection assist for a customer receiving a service,
wherein the program runs on the computer and works with a server,
wherein the server is connected to at least a terminal of the customer through a network, and obtains information from a customer information storage unit storing at least a place information of the customer, a staff information storage unit storing a current place information of each staff of a plurality of staff providing the service as staff information, a transportation information storage unit storing at least transportation facility time information and transportation cost information, and from a component information storage unit that stores component information, and
wherein the program is executable by the computer and allows the server to perform, when receiving service list request information from the terminal of the customer, the service list request information including priority information indicating which item in the service list is of greater priority to the customer, the method steps of:
searching and collecting the place information of the customer from the customer information storage unit, on the basis of customer specific information received from the terminal of the customer;
collecting the current place information of each staff providing the service from the staff information storage unit;
determining a component cost and a component delivery time for delivering the component on the basis of the component information received from the component information storage unit;
determining move time needed for each staff to, at a time of request by the customer, get to the customer, the determination being made on the basis of the place information of the customer, the current place information of each staff, and the transportation facility time information from the transportation information storage unit;
determining transportation cost for each staff to, at a time of request by the customer, get to the customer, the determination being made on the basis of the respective locations of each staff as compared with the location of the customer and the transportation cost information from the transportation information storage unit,
calculating time needed for each staff to start providing the service at a place where the customer is located, the time needed being determined on the basis of the determined move time, a current availability of each staff, and the component delivery time for the component, wherein the time needed for each available staff to start providing the service at the place where the customer is located corresponds to the component delivery time when the component delivery time is greater than the respective move time;

calculating a customer service charge, which is generated on the basis of the determined transportation cost and the component cost;

creating a service list information, which lists each available staff and indicates at least the time needed and the service charge for each staff to start providing the service at the place where the customer is located; and sending the service list information to the terminal of the customer via a transceiver unit for display, displaying the service list information on the terminal of the customer based on the priority information indicating which item in the service list is of greater priority to the customer, and receiving a selection of one of the plurality of staff selected by the customer from the displayed service list information.

10. A non-transitory storage medium readable by a computer, the medium storing a program of instructions to perform a service selection assist for a customer receiving a service, wherein the program runs on the computer and works with a server, wherein the server is connected to at least a terminal of the customer through a network, and obtains information from a customer information storage unit storing at least a place information of the customer, a staff information storage unit storing a current place information of each staff of a plurality of staff providing the service as staff information, a transportation information storage unit storing at least transportation facility time information and transportation cost information, and from a component information storage unit that stores component information, and wherein the program is executable by the computer and allows the server to perform, when receiving service list request information from the terminal of the customer, the service list request information including priority information indicating which item in the service list is of greater priority to the customer, the method steps of:

searching and collecting the place information of the customer from the customer information storage unit, on the basis of customer specific information received from the terminal of the customer;

collecting the current place information of each staff providing the service from the staff information storage unit;

determining a component cost and a component delivery time for delivering the component on the basis of the component information received from the component information storage unit;

determining move time needed for each staff to, at a time of request by the customer, get to the customer, the determination being made on the basis of the place information of the customer, the current place information of each staff, and the transportation facility time information from the transportation information storage unit;

determining transportation cost for each staff to, at a time of request by the customer, get to the customer, the determination being made on the basis of the respective locations of each staff as compared with the location of the customer and the transportation cost information from the transportation information storage unit;

calculating time needed for each staff to start providing the service at a place where the customer is located, the time needed being determined on the basis of the determined move time, a current availability of each staff, and the component delivery time for the component, wherein the time needed for each available staff to start providing the service at the place where the customer is located corresponds to the component delivery time when the component delivery time is greater than the respective move time;

calculating a customer service charge, which is generated on the basis of the determined transportation cost and the component cost;

creating a service list information, which lists each available staff and indicates at least the time needed and the service charge for each staff to start providing the service at the place where the customer is located; and sending the service list information to the terminal of the customer via the transceiver unit for display;

displaying the service list information on the terminal of the customer based on the priority information indicating which item in the service list is of greater priority to the customer; and receiving a selection of one of the plurality of staff selected by the customer from the displayed service list information.

11. A method for operating an optimum service selection assisting system which includes a server for performing a service selection assist for a customer receiving a service, a terminal of the customer connected to the server through a network, a customer information storage unit storing at least a place information of a the customer, a staff information storage unit storing at least a current place information of each staff of a plurality of staff providing the service, a transportation information storage unit storing at least transportation facility time information and transportation cost information, and from a component information storage unit that stores component information, the method comprising the steps of:

sending service list request information including at least customer specific information from the terminal of the customer to the server, the service list request information including priority information indicating which item in the service list is of greater priority to the customer;

searching and collecting, the place information of the customer from the customer information storage unit, on the basis of the customer specific information received from the terminal of the customer;

collecting the current place information of each staff providing the service from the staff information storage unit;

determining a component cost and a component delivery time for delivering the component on the basis of the component information received from the component information storage unit;

determining move time needed for each staff to, at a time of request by the customer, get to the customer, the determination being made on the basis of the place information of the customer, the current place information of each staff, and the transportation facility time information of the transportation information storage unit;

determining transportation cost for each staff to, at a time of request by the customer, get to the customer, the determination being made on the basis of the respective locations of each staff as compared with the location of the customer and the transportation cost information from the transportation information storage unit;

calculating time needed for each staff to start providing the service at a place where the customer is located, the time needed being determined on the basis of the determined move time, a current availability of each staff, and the component delivery time for the component, wherein the time needed for each available staff to start providing the service at the place where the customer is located corresponds to the component delivery time when the component delivery time is greater than the respective move time;

calculating a customer service charge, which is generated on the basis of the determined transportation cost and the component cost;

creating service list information, which lists each available staff and indicates the time needed and the service charge for each staff to start providing the service at the place where the customer is located;

sending the service list information to the terminal via a transceiver unit for display; and displaying the service list information on a display unit of the terminal of the customer based on the priority information indicating which item in the service list is of greater priority to the customer when receiving service list information from the server.

12. A method for operating a server, wherein the server is connected to at least a terminal of a customer through a network, and collects information needed from a customer information storage unit storing at least place information of the customer, a staff information storage unit storing a current place information of a staff providing a service as staff information, a transportation information storage unit storing at least transportation facility time information and transportation cost information, and from a component information storage unit that stores component information, the method comprising the steps of:

searching and collecting the place information of the customer from the customer information storage unit, when receiving service list request information from the terminal of the customer, on the basis of customer specific information received from the terminal of the customer, the service list request information including priority information indicating which item in the service list is of greater priority to the customer;

collecting the current place information of each staff providing the service from the staff information storage unit;

determining a component cost and a component delivery time for delivering the component on the basis of the component information received from the component information storage unit;

determining move time needed for each staff to, at a time of request by the customer, get to the customer, the determination being made on the basis of the place information of the customer, the current place information of each staff, the transportation facility time information of the transportation information storage unit;

determining transportation cost for each staff to, at a time of request by the customer, get to the customer, the determination being made on the basis of the respective locations of each staff as compared with the location of the customer and the transportation cost information from the transportation information storage unit;

calculating the time needed for each staff to start providing the service at a place where the customer is located, the time needed being determined on the basis of the obtained move time, a current availability of each staff, and the component delivery time for the component, wherein the time needed for each available staff to start providing the service at the place where the customer is located corresponds to the component delivery time when the component delivery time is greater than the respective move time;

calculating a customer service charge, which is generated on the basis of the obtained transportation cost and the component cost;

creating service list information, which lists each available staff and indicates at least the time needed and the service charge for each staff to start providing the service at the place where the customer is located;

sending the service list information to the terminal of the customer via a transceiver unit for display;

displaying the service list information on the terminal of the customer based on the priority information indicating which item in the service list is of greater priority to the customer; and receiving a selection of one of the plurality of staff selected by the customer from the displayed service list information.

* * * * *